Jan. 13, 1925. 1,522,613
T. S. COLE
STORAGE BATTERY CONSTRUCTION
Filed Aug. 3, 1920 2 Sheets-Sheet 1
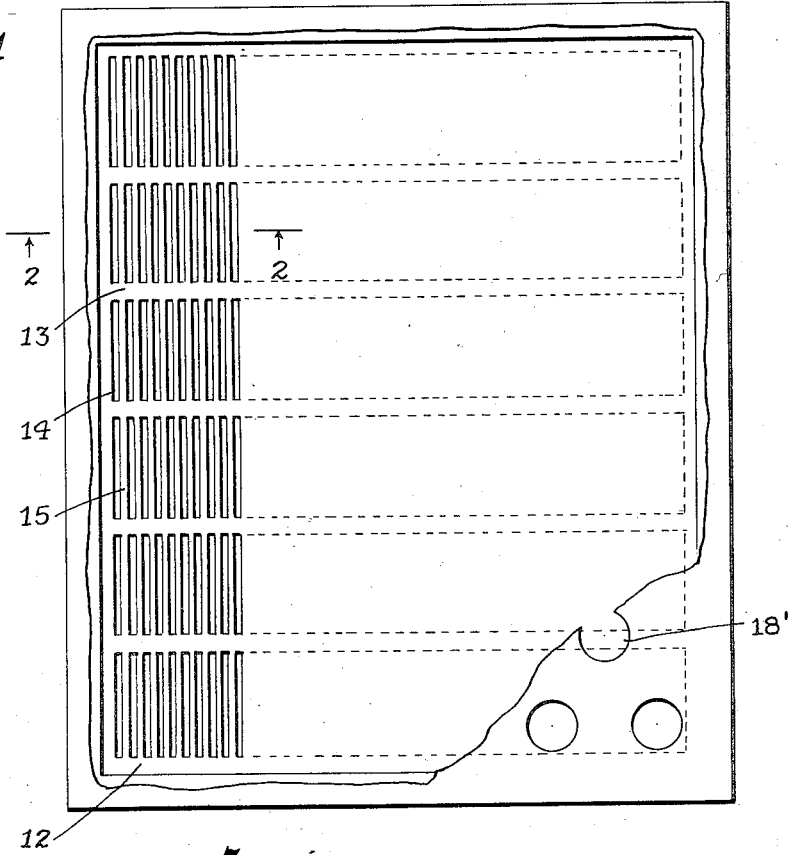
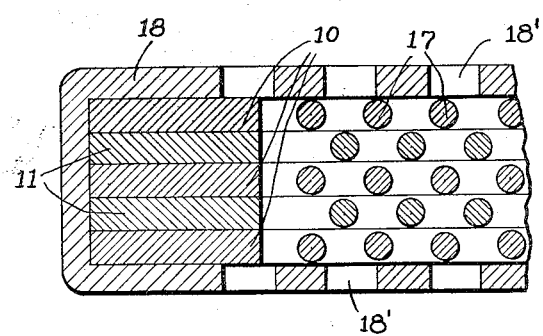
Inventor
Theodore S. Cole,
By his Attorneys Jan. 13, 1925.
T. S. COLE
1,522,613
STORAGE BATTERY CONSTRUCTION
Filed Aug. 3, 1920    2 Sheets-Sheet 2
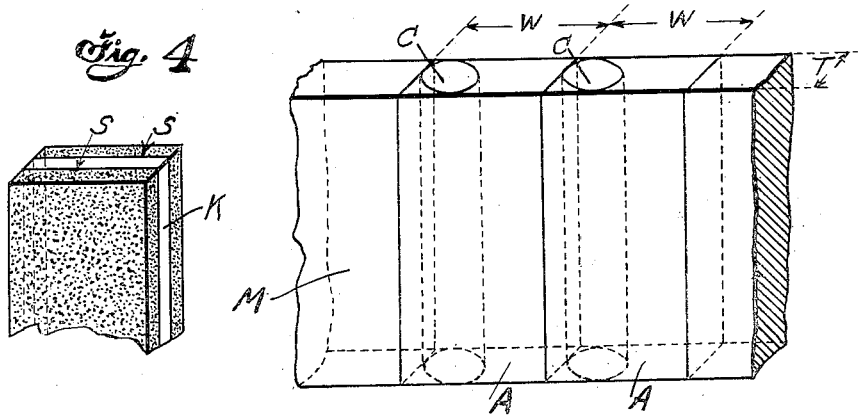
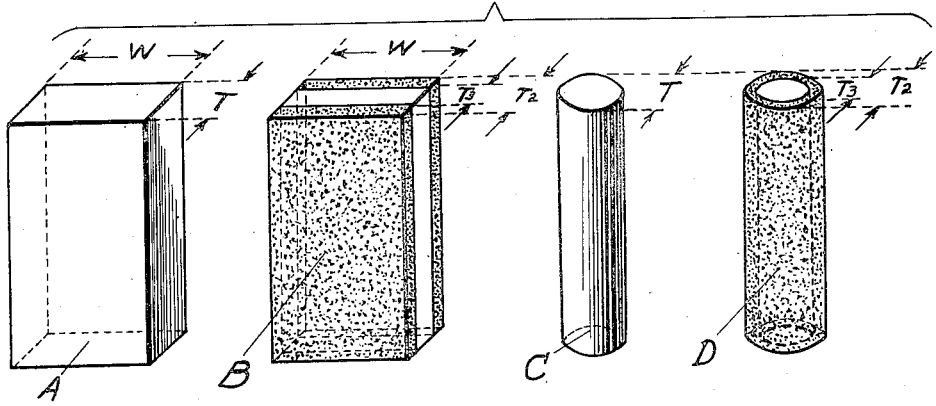
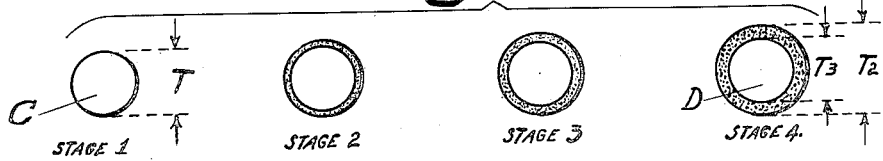
Theodore S. Cole INVENTOR.
BY Robert S. Blair
ATTORNEY.

Patented Jan. 13, 1925.

1,522,613

UNITED STATES PATENT OFFICE.

THEODORE S. COLE, OF WASHINGTON, DISTRICT OF COLUMBIA, ASSIGNOR TO SAFETY CAR HEATING & LIGHTING COMPANY, A CORPORATION OF NEW JERSEY.

STORAGE-BATTERY CONSTRUCTION.

Application filed August 3, 1920. Serial No. 400,996.

*To all whom it may concern:*

Be it known that I, THEODORE S. COLE, a citizen of the United States, and a resident of Washington, in the District of Columbia, have invented an Improvement in Storage-Battery Constructions, of which the following is a specification.

This invention relates to the construction of storage or secondary batteries and more particularly to the construction of plates in such batteries. One of the objects thereof is to provide a simple and practical plate of the above type of highly efficient action. Another object is to provide a plate of the above type which may be readily constructed at low cost. Another object is to provide a plate of the above type in which with a given amount of metal a large amount of active surface will be effectively exposed.

Other objects are to provide a plate of the above type characterized by durability, lightness, and uniformity of action and freedom from warping in use.

Other objects will be in part obvious and in part pointed out hereinafter.

The invention accordingly consists in the features of construction, combinations of elements and arrangement of parts which will be exemplified in the structure hereinafter described and the scope of the application of which will be indicated in the following claims.

In the accompanying drawings in which is shown one of various possible embodiments of this invention, Figure 1 is a side view of a complete battery plate;

Figure 2 is a sectional view on the line 2—2 of Figure 1, showing the parts on an enlarged scale;

Figure 3 is a detailed sectional view showing an intermediate stage of construction of one of the parts;

Figure 4 is a fragmentary perspective view on an enlarged scale of a sheet of lead undergoing formation;

Figures 5 and 6 are diagrammatic perspective views on an enlarged scale of various elemental sections of base metal illustrative by comparison of certain phenomena and actions that take place; and, Figure 7 shows certain successive sectional views of an active element to illustrate certain physical actions that take place.

Similar reference characters refer to similar parts throughout the several views of the drawings.

Referring now to the drawings in detail, the body of the plate is built up of a number of lead sheets. These sheets as shown in Figure 2, are of two slightly different forms, those indicated at 10 being similar to each other and slightly dissimilar with respect to the sheets 11, as later herein described.

These sheets, which may be formed of sheet lead, are in the neighborhood of one-twentieth of an inch in thickness and are stamped or otherwise shaped into the form indicated in Figure 1 of the drawings. About the entire sheet is a border portion 12 and at intervals there are horizontal ribs or uncut portions 13. Between the ribs 13 is a large number of openings 14 of substantially the proportions shown in the drawings, and extending across the plate to the opposite border as indicated by the dotted lines. The metal between these openings 14 thus forms a number of what may be termed "bars" 15. If the openings 14 are cut from sheet metal, the bars 15 might first have the form indicated at 16 in Figure 3 of the drawings and would thereafter be pressed by suitable dies or otherwise, to the substantially round cross-section shown at 17 in Figure 2 of the drawings.

With the plates thus formed, a number of them are placed flatwise against one another with their borders in registry, as indicated in Figure 2, and are firmly bound in position by an outer frame 18 which may be formed of an inert metal such as a lead-antimony alloy. This frame or outer casing preferably extends over both sides of the composite plate, its portions opposite the active portions of the plate being perforated as shown at 18′ so as not to interfere with their electrolytic action.

It may be noted at this point that the plates 10 differ from the plates 11 in that the sets of bars in the latter, although equally spaced, begin at a slightly greater distance from their adjacent border 12. These plates are alternated with the plates 11 and the parts are so disposed that the various bars are staggered in transverse cross-section as shown in Figure 2.

It may also be noted at this point that although certain features of this invention are of value in the constructon of a paste plate, nevertheless it is intended that the plate be formed according to the Planté method, and it possesses many advantages peculiar to such construction and use.

In the action of the plate, it is mounted in the cell in the ordinary way with associated plates of the same construction, the plates being connected together and to the respective terminals of the battery in the usual way. The plate when formed acts to expose an extremely large amount of active surface, as will be seen from the construction, and allows ready access of the electrolyte to the active parts. Furthermore, the action is substantially uniform throughout and any active material which might become detached from the bars and drop down is not permitted to fall to the bottom of the cell and become useless, but rests merely upon the next lower rib portion 13 and still remains in action. It will also be seen that the plate is substantially free from a tendency to warp, due to its rigid and symmetrical construction and uniform action. In effect the plate is active throughout its entire body instead of merely upon its surface, thus rendering it far more efficient than a surface-acting plate even though such surface be artificially increased by expedients now in use.

It will thus be seen that there is provided a construction in which the objects of this invention are achieved and which is well suited to meet the hardest conditions of practical use.

From the foregoing, it will be wholly clear how to practice my invention, it being noted that I have hereinabove specified and described and shown in Figures 1, 2 and 3 of the drawing, all in sufficient detail, a preferred and thoroughly practical embodiment of this invention. Certain theoretical considerations may however be helpful in more clearly understanding not only the practical advantages achieved by this invention, but also what I believe are the principles underlying the achievement of these advantages; such theoretical considerations are not deemed necessary to a realization in practice of the thoroughly practical advantages of my invention as a possible and practicable embodiment thereof has been hereinbefore structurally described, shown and set forth, and such theoretical considerations will be hereinafter set forth as a possible aid by way of amplifying or explaining the highly beneficial actions in practice of the construction already hereinbefore described and set forth.

It has already been hereinbefore noted that the action of the plate is substantially uniform throughout, that it is in effect active throughout its entire body instead of merely upon its surface and that the plate construction of this invention possesses many advantages peculiar to the Planté method of formation and use. The activity of the plate throughout its entire body, its uniformity of action throughout, and the many practical advantages, such as durability, and freedom from warping in use, for example, may be perhaps more clearly understood and appreciated by reference to Figures 4 to 7 of the drawings and by a consideration of the phenomena that attend the formation of the plate as by the Planté process. For convenience, reference may be made to the construction of a positive Planté type of plate, as by, of course, the Planté process, the active material formed during this process being, as is well known, chiefly lead peroxide ($PbO_2$), and for convenience, it will be so considered hereinafter.

Lead peroxide has, as is well known, a density considerably less than that of lead; hence, where the plate is formed from the base lead, the peroxide formed thereon must expand or tend to expand in all three directions. During such expansion the stresses occurring between the surfaces of juncture between the base lead and the peroxide must be maintained within a maximum allowable limit in order to prevent these stresses, which appear as shearing forces, from causing a separation of the peroxide from the base lead to take place. The magnitudes of these shearing forces are difficult of determination but may be at least illustratively arrived at empirically or from data obtained in appropriate experiments. Thus, for example, and for purposes of concrete illustration, it may be found by experiment that a strip of lead ½" wide and 0.028" thick will expand approximately 3% linearly when subjected to the Planté process of formation of peroxide upon its surfaces to a depth of 0.003" on each side of the strip, and that this elongation or expansion of 3% takes place in about 60 hours.

Furthermore, by experiment it may be demonstrated that a lead strip will increase in length at the rate of 0.025% per hour per 1,000 lbs. of force applied per square inch cross section. In the case of the first-mentioned strip undergoing an elongation of 3% in 60 hours during the forming process, the time rate of expansion or of flow per hour will be $\frac{1}{60}$ of 3%, or 0.050%. This figure, namely 0.050%, is thus seen to be twice as great as in the case of the second-mentioned lead strip subjected to a force of 1,000 lbs. per square inch of cross section. Therefore, the stress per square inch of cross section in the case of the formed strip must be approximately 2,000 lbs., which figure is about equivalent to the tensile strength of lead. Thus, referring to the section K in Fig. 4, wherein is shown diagrammatically the strip formed to a depth of 0.003", the thickness of the remaining base lead becomes 0.022". The shearing force at the surface S must then be ½×0.022×2,000, or 22 lbs. per linear inch where the cross section of the lead is ½×0.022, or 0.011 sq. inches. Should the stress for the given section exceed 22 lbs. per linear inch of strip, the allowable limit as arrived at above will be exceeded and the resulting shearing forces will be sufficient to cause a separation of the peroxide from the base lead. Thus, it will be noted, the resistance of the base metal to elongation will exceed the expanding forces of the active material, and relative movement or shearing between the two will take place. From these figures it will be seen that the ratio of the perimeter (disregarding the thickness of the base lead) to the cross-sectional area, expressed in inches and square inches, respectively, is $$\frac{½+½}{0.011} = 90.$$

If this ratio is less than 90, the shear per linear inch of strip between the peroxide coating and the base lead will exceed 22 lbs. and blistering and peeling of the peroxide will take place.

The forces acting to bring about shedding act in both the horizontal and the vertical direction. This will be evident when it is considered that the peroxide being formed must occupy a greater space than the base metal out of which it is formed. Their effect, if any, in the direction normal to the surface under consideration may be neglected since the active material or the peroxide is free to expand in the direction normal to the surface of the base lead. Having thus arrived at the approximate magnitude of the forces that tend to bring about the undesirable shedding, peeling or blistering of the active material, a suitable cross section must now be found to satisfy the above conditions so that the maximum allowable shearing stresses are not exceeded and so that whatever stresses or forces become active either during the process or formation of the plate or during the charge or discharge of the battery may bring about an expansion or contraction, as the case may be, of the grid or base lead itself. An example of such a cross section will be seen to be the of elements 15 of Fig. 1 or the elements 17 of Fig. 2. Thus forces tending to cause a relative movement between the coating or active material and the base lead itself may be avoided and separation of the peroxide from the base metal prevented, thus increasing durability of the plate.

But in order to arrive at the desired section of base lead to be employed, certain other considerations and requirements must be fulfilled. Thus, for example, the life per unit weight of the battery demands that the ratio of the cross section of the base lead to the cross section of the active material which is formed thereon be a maximum. Furthermore, this cross section must also, as already above set forth, satisfy the conditions placing the resultant construction within the allowable limits of shearing force.

By way of example, a cylinder of circular cross section, as the elements 17 of Fig. 2, may be employed under certain other conditions to satisfy the above-enumerated requirements. In order to make for a clearer understanding of the action and advantages of a cylindrical embodiment of this invention, reference may be made to certain elements or portions of sections of base lead illustrated in Figs. 5 and 6 of the drawings. At M in Fig. 5 of the drawings there is shown in perspective a section of a relatively thin sheet of lead having a thickness T and being of unit length (vertically). In order to consider the stresses that take place or become active between the coating of active material and the base lead, let the section M be subdivided into a series of small elements A having a width W and having, of course, the thickness T and a length of unity; and in order to arrive at a suitable basis of comparison between the phenomena taking place in the case of a sheet of lead and the phenomena taking place in the case of the section or element desired to be employed, in this case a cylindrical element, let there be substituted for each element A of rectangular cross section, an element C of the desired or circular cross section. Thus in Fig. 5 there is shown a cylinder C of diameter T, illustrative of a bar or element 17 of Fig. 2, substituted for each element A of rectangular cross section. For purposes of clearer illustration, the element A of rectangular cross section and the element C of the desired or circular cross section are shown separately in perspective in Fig. 6 of the drawings.

For purposes of facilitating comparison and since the active material and its forces act upon the base metal throughout the contacting surface areas between active material and base metal, the exposed lateral surfaces available for taking part in the action of formation will be made equal in both assumed cases A and C so that the expanding forces of the active material will be the same in each case. The exposed area of the element A, (shown separately in Fig. 6) will be W×1 (unit length) ×2, or 2W; and this exposed area is to be equal, under the above assumption, to the exposed lateral area of the element C, which is $\pi T \times 1$ (unit length). Equating these two values for the available lateral areas, we have the following relations:

$$2W = \pi T$$

hence $$(a), W = \frac{\pi T}{2}.$$

At this point it may be of interest to compare the weights of the elements A and C. If $\rho$ is the density of lead, the weight of section A will be $W \times T \times 1 \times \rho$, or $WT\rho$. The weight of the section C will be $$\frac{\pi T^2}{4} \times 1 \times \rho,$$

or $$\frac{\pi T^2 \rho}{4}.$$

The ratios of the weights of the element A to the element C will then be $$\frac{4WT\rho}{\pi T^2 \rho}.$$

Since $W = \frac{\pi T}{2}$, this ratio becomes $$\frac{4(\pi T)T\rho}{\frac{2}{\pi T^2 \rho}} = 2.$$

Thus it will be seen that the weight of the cylindrical element C for a given exposed area available for formation of active material thereon is one-half of that where a sheet of lead such as M in Fig. 5 is employed.

At B and D in Fig. 6 are shown the elements A and C, respectively, after formation to a depth equal to $$\frac{1}{2}(T_2 - T_3),$$

the two elements being formed to the same depth, where $T_2$ is the thickness of the element after formation and $T_3$ is the thickness of the remaining base lead after formation.

Referring now to the sections B and D, the contact area between the active material and the base lead in the case of the element B is $2 (W \times 1)$, or $2W$, and the corresponding contact area of the element D is $\pi T_3 \times 1$. The ratio of the contact areas in the case of the two sections B and D is therefore $$(b) \quad \frac{2W \times 1}{\pi T_3 \times 1} = \frac{2W}{\pi T_3}.$$

The cross-sectional area of the remaining base lead in the case of the element B will be $W \times T_3$, and in the case of element D will be $$\frac{\pi T_3^2}{4}.$$

The ratio of the cross-sectional areas of the base lead of the elements B and D will then be $$(c) \quad \frac{W \times T_3}{\frac{\pi T_3^2}{4}} = \frac{4W}{\pi T_3}.$$

Let the following values be assigned to the several thicknesses T, $T_2$ and $T_3$, for purposes of concrete illustration:

$$T = 0.041''$$
$$T_2 = 0.053''$$
$$T_3 = 0.035''$$

These values are such as have been found in practise to result in an efficient and effective element after formation. Then, substituting these values in equation $(b)$, the ration of the contact areas between the base lead and the active material in the case of the elements B and D will be 1.17; and substituting these values in equation $(c)$, the ratio of the cross-sectional areas of the base lead in the two cases will be 2.34.

From the considerations hereinbefore set forth, it will be seen that the resistance offered to the shearing forces tending to separate the active material from the base lead are proportional to the cross-sectional area of the base lead itself, since the base lead should follow the expanding and contracting forces active in the active material itself. It may therefore be assumed that the expanding force, for example, causing the shear between the peroxide coating or active material and the base lead and acting against the resistance to elongation of the base lead is proportional to the cross-sectional area of the peroxide. Then, bearing in mind that the elements B and D are of unit length, the shear beween the peroxide and the base lead in the case of element B is proportional to $W \times T_3$, and in the case of element D is proportional to $$\frac{\pi T_3^2}{4}.$$

For the same cross-sectional areas of the peroxide coatings in the two cases the shear in case D is proportional to $$\frac{\pi T_3^2}{4} \times 1.17.$$

The actual ratio of the cross-sectional areas of the peroxide coating, that is, the ratio of the cross-sectional area of the coating on B to that of the coating on D is $$(d) \quad \frac{W(T_2 - T_3)}{\frac{\pi}{4}(T_2^2 - T_3^2)}.$$

Then, substituting the above assumed values and substituting for W the value $\frac{\pi T}{2}$ hereinbefore derived, the actual ratio according to the equation (d) becomes $$(e) \quad \frac{0.256}{0.276} \text{ or } 94\%.$$

Apparently, therefore, the cross-sectional area of the peroxide coating on the cylindrical element D is greater than that of the coating on the flat surfaces of the element B. Since, however, it may be actually found that the coating on the cylindrical element has a series of fine longitudinally extending cracks due to the expansion in the horizontal plane, compensation should be made for the cross-sectional areas represented by these cracks. The cross-sectional areas of these cracks may, for this purpose, be assumed as probably not exceeding 10% (as may be determined from microphotographs) of the total cross section of the theoretical cross-sectional area of the active material. Therefore, the actual cross-sectional area of the peroxide on B may be assumed to be 104% of that on D.

Then, since as above noted and as represented by equation (c), the ratio of shear between the coating and the lead in case of element B and in case of element D, that is, per unit length of element, will be $$(f) \quad \frac{WT_3}{\frac{\pi T_3}{4} \times 1.17 \times 1.04}$$

and, substituting the above mentioned values, this ratio is found to be 1.92. Thus it will be seen that for the same shearing forces that may act in the case of a cylindrical element such as D as take place in an element such as B or as in K hereinbefore considered in connection with Fig. 4, the cross-sectional area of the base lead may be 92% greater than in the case of an element like that of B. That is, the cross-sectional area of the base lead in the element D may be made 92% greater and at the same time the shearing forces tending to separate the active material from the base lead are maintained within the allowable limit hereinbefore considered. The life of a battery plate, as hereinbefore already briefly mentioned, is, among other factors, directly proportional to the thickness of the base lead available. Since in the case of the element D, herein set forth by way of example as of circular cross section, the cross-sectional area may be made 92% greater than in the case where an element like A is employed, the life of the plate and hence of the battery will be increased at least 92% for the same weight of lead over that of a plate employing elements such as the element A.

The above considerations have been directed mainly to the shear stresses or forces that take place in a vertical direction, that is, along the length of the element B or D for example. As already noted, the peroxide coating formed from the base metal will expand in all three directions. The expansion in the horizontal plane, that is, in a direction normal to the surface under consideration, need not be considered since as already noted the peroxide is free to expand in these directions without materially affecting the base lead. The stresses occurring, however, in the horizontal plane and along the contacting surfaces may also affect the separation between the active material and the base lead. In Fig. 7 of the drawings there is illustrated in cross section an element C undergoing successive stages of formation as shown in the series of views until the section D already hereinabove considered is arrived at. As the formation progresses inwardly, the peroxide expands outwardly since its density is materially less than that of the base lead. Hence, the thin layer of peroxide produced in stage 1 of Fig. 7 must expand in the horizontal plane from a peripheral length equal to T to a peripheral length equal to $T_2$. Making use of the values for these dimensions above assumed, it is found that the tangential or peripheral expansion would be about 29%. This figure is large enough to warrant the presumption that no tangential forces or forces in the horizontal plane acting in the direction of the surface of contact are present to bring about a shedding of the coating from the base lead and it will therefore be seen that the main consideration is the one that deals with the shearing stresses acting in the direction of the length of the element under consideration since, as above shown, the expansion in the remaining two directions is substantially ineffective to bring about a shearing action.

Considering now again the relation represented by the ratio $(f)$ which, as above noted, reduces to 1.92 when the above-assumed values for the several dimensions are substituted therein and represents the ratio of the shearing between the coating and the lead in the cases represented by the elements B and D: From this relation $(f)$ it will be seen that for the same shearing forces effective to bring about a separation of the coating from the base lead in the case of element B, the shearing forces operative upon the element D meet with a resistance from the base lead which is $$\frac{1}{1.92},$$

or 52% as great as is the resistance offered by the base lead in the case of the section B. It will therefore be seen that the active material, either during the process of formation, when expansion takes place, or during charge or discharge of the battery when contraction and expansion respectively take place, is opposed in the forces exerted thereby by substantially one-half the magnitude of the resistance offered by the base lead in the case of the element D than in the case of the element B. Thus each individual element D may more readily follow the expanding and contracting tendencies exerted thereon by the active material with the result that no relative movement between the coating and the lead itself can take place to bring about a shedding of the active material. Furthermore, it will be noted that the ratio of the perimeter to the cross-sectional area in the case of the element C from which the element D is derived is not less than the limit of 90 hereinbefore set forth, and that in the case of the element D the shearing forces are thus maintained well within the allowable maximum limit and such undesirable shedding of active material prevented.

From the foregoing, the phenomena attendant upon the formation and subsequent action of the plate construction provided by this invention, will be more clearly understood together with the practical advantages resulting therefrom. It will be seen that the uniformity of action results in a great durability, it will be further seen that freedom from warping in use is achieved not only by such uniformity of action, but also by making the plate as a whole active throughout its entire body instead of merely upon its surface, as will be clear from a consideration of Figure 2, and it will also be seen that, in embodying my invention, as shown in Figures 1 and 2 and described in connection therewith, a highly desirable lightness of construction is achieved. The metal will be seen to be distributed in such manner as well as with such symmetry as will insure not only activity of the plate throughout its entire body as distinguished from surface activity, with consequent highly efficient action, but also such uniformity of action as will insure to the plate durability and freedom from warping in use. These and other practical advantages will be perhaps better understood and appreciated from the foregoing theoretical considerations and discussions, though it will be understood that the objects and advantages of this invention may be fully realized and achieved in practise by the preferred and illustrative embodiment of this invention shown in Figures 1 and 2 of the drawings, the construction of which, and hence the manner of achieving these advantages and objects having been hereinbefore described amply in direct connection with these figures of the drawings.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:

1. In construction for storage battery plates, in combination, a plate member comprising a plurality of spaced bars each of which bars has an area exposed to the active material and throughout which said material may be formed so related to its cross-sectional area that, during formation, the expansive stresses exerted upon the bar by the active material being formed thereon are, throughout its periphery, substantially equally and uniformly opposed by the resistance of the bar to elongation.

2. In construction for storage battery plates, in combination, a plate member comprising a plurality of spaced bars each of which, in cross section, is symmetrical about each of two axes at substantially right angles to each other so that, upon formation, the resistance of the bar to elongation is substantially equally divided on the two sides of each axis, each bar being so dimensioned that the resistance of the bar to elongation is not greater than the total stress exerted upon the bar by the active material formed thereon.

3. In construction for storage battery plates, in combination, a sheet-like metal member having formed therein a plurality of rounded bars in spaced relation, each of which, in cross section, is symmetrical about each of two axes at substantially right angles to each other so that, upon formation, the resistance of the bar to elongation is substantially equally divided on the two sides of each axis, each bar being so dimensioned that the resistance of the bar to elongation is not greater than the total stress exerted upon the bar by the active material formed thereon.

4. In construction for storage battery plates, in combination, a plate member comprising a plurality of spaced bars each of which is of circular cross section to provide symmetry therefor about any axis, so that, upon formation, the expansive stresses exerted upon the bar by the active material being formed thereon and the opposed resistance to elongation of the bar are substantially uniformly distributed throughout the periphery of the bar and each equally on each side of any axis, said bar having such a diameter that the resistance of the bar to elongation is not greater than the total stresses exerted upon the bar by the active material formed thereon.

5. In construction for storage battery plates, in combination, a plate member comprising a plurality of spaced bars of circular cross section extending in the same general direction, each of which has a diameter of substantially one-twentieth of an inch prior to formation, and means for holding said bars in spaced relation.

6. In construction for storage battery plates, in combination, a plate member comprising a plurality of substantially parallel spaced elements formed integrally therewith and extending in an upright direction, each of said elements having a ratio of perimeter to cross-sectional area, when expressed in English units of inches equal to or greater than 90.

7. In construction for storage battery plates, in combination, a storage battery plate built up of three or more sheet-like sections each of which comprises a plurality of closely spaced bars, the bars of each of said sheets being in staggered relation with respect to those of the adjacent sheets.

8. In construction for storage battery plates, in combination, a storage battery plate built up of a plurality of sheet-like sections each of which comprises a plurality of sets of closely spaced bars and interposed means adapted to hold the ends of said bars in fixed relation.

9. In construction for storage battery plates, in combination, a storage battery plate built up of a plurality of sheet-like sections, each of which comprises a plurality of sets of closely spaced bars and interposed means adapted to hold the ends of said bars in fixed relation, said bars being spaced one from another by a distance substantially equal to their maximum cross-sectional dimension.

10. In construction for storage battery plates, in combination, a storage battery plate built up of a plurality of sheet-like sections, each of which comprises a plurality of sets of closely spaced bars and interposed means adapted to hold the ends of said bars in fixed relation, each of said sets of bars being substantially in registry with the adjacent sets and the individual bars of each section being out of registry with the adjacent section.

11. In construction for storage battery plates, in combination, a storage battery plate built up of a plurality of sheet-like sections, each section comprising a plurality of sets of fine bars arranged one above the other and said bars being spaced one from another by a distance substantially equal to their diameter, and binding means extending about said sections and holding them together.

12. In construction for storage battery plates, in combination, a storage battery plate built up of a plurality of sheet-like sections, each section comprising a plurality of sets of fine bars arranged one above the other and said bars being spaced one from another by a distance substantially equal to their diameter, and binding means extending about said sections and holding them together, said sets of bars being substantially in registry with the sets of the adjacent section and said bars of said several sections being in staggered relation with respect to the adjacent sections.

13. In construction for storage battery plates, in combination, a plate member comprising a plurality of spaced bars, each of which has a ratio of perimeter to cross-sectional area, when expressed in English units of inches, greater than seventy.

14. In construction for storage battery plates, in combination, a plate member comprising a plurality of spaced bars, each of which is dimensioned so that its resistance to elongation is not greater than the stress exerted upon the bar during formation by the active material formed thereon, and means for holding said bars in spaced relation.

15. In construction for storage battery plates, in combination, a plate member comprising a plurality of spaced, rounded bars extending in the same general direction, each of which is dimensioned so that its resistance to elongation is not greater than the stress exerted upon the bar during formation by the active material formed thereon, and means extending transversely of said bars for holding said bars in spaced relation.

16. In construction for storage battery plates, in combination, a plate member of sheet-like construction having formed therein a plurality of sets of relatively closely spaced bars, each of said bars having a ratio of perimeter to cross-sectional area, when expressed in English units of inches, equal to or greater than 90, and said sets being arranged one above another.

17. In construction for storage battery plates, in combination, a storage battery plate built up of a plurality of sheet-like sections, each section of which comprises a plurality of spaced bars, each of which bars has an area exposed to the active material and throughout which active material may be formed so related to its cross-sectional area that, upon formation, the resistance of the bar to elongation is not greater than the total stress exerted upon the bar by the active material formed thereon, and means formed of an inert material for substantially encasing said plurality of sheet-like sections.

18. In construction for storage battery plates, in combination, a storage battery plate built up of a plurality of sheet-like sections, each section of which comprises a plurality of spaced bars, each of which bars has an area exposed to the active material and throughout which active material may be formed so related to its cross-sectional area that, upon formation, the resistance of the bar to elongation is not greater than the total stress exerted upon the bar by the active material formed thereon, and perforated sheet-like members formed of an inert material and of substantially the same expanse as said sheet-like sections, one positioned adjacent each outer sheet-like section.

19. In construction for storage battery plates, in combination, a storage battery plate built up of a plurality of sheet-like sections, each section comprising a plurality of spaced bars of rounded cross-section, each bar having a thickness of substantially one-twentieth of an inch prior to formation, and means formed of an inert material for substantially entirely encasing said plurality of sheet-like sections.

In testimony whereof, I have signed my name to this specification this 22d day of July, 1920.

THEODORE S. COLE.